United States Patent
Ito et al.

(10) Patent No.: US 6,565,905 B1
(45) Date of Patent: *May 20, 2003

(54) SILICA GEL FOR STABILIZATION TREATMENT OF BEER, A METHOD OF MANUFACTURING THE SILICA GEL AND A METHOD OF THE STABILIZATION TREATMENT OF BEER

(75) Inventors: Mutsuhiro Ito, Aichi (JP); Shinji Yamamoto, Aichi (JP); Akihiko Okada, Tokyo (JP); Yoshihisa Ishiwata, Tokyo (JP)

(73) Assignees: Fuji Silysia Chemical Ltd., Kasugai (JP); Kirin Beer Kabushiki Kaisha, Tokyo-to (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/889,563

(22) Filed: Jul. 8, 1997

(51) Int. Cl.[7] ............................................. C10B 33/12
(52) U.S. Cl. .................... 426/330.4; 423/335; 423/339; 426/423
(58) Field of Search ............................. 426/330.4, 426, 426/339, 423; 423/335, 339, 337

(56) References Cited

U.S. PATENT DOCUMENTS

| | | | | |
|---|---|---|---|---|
| 3,617,304 A | * | 11/1971 | Barby et al. ................. | 426/442 |
| 4,042,769 A | * | 8/1977 | Lynch ........................ | 526/106 |
| 4,515,821 A | * | 5/1985 | Armstead et al. ........ | 426/330.4 |
| 4,855,273 A | * | 8/1989 | Pohl et al. .................. | 502/244 |
| 4,975,405 A | * | 12/1990 | Okimura et al. ............ | 502/233 |
| 5,622,743 A | * | 4/1997 | Tanaka et al. ........... | 426/330.4 |
| 5,656,568 A | * | 8/1997 | Shiuh et al. ................ | 502/412 |

FOREIGN PATENT DOCUMENTS

| | | | |
|---|---|---|---|
| EP | 287232 | * | 1/1993 |
| GB | 1279250 | * | 6/1972 |
| JP | 5 70120 | | 3/1993 |
| JP | 5 97421 | | 4/1993 |
| JP | 63 38188 | | 12/1994 |
| JP | 08-173137 | * | 7/1996 |

* cited by examiner

*Primary Examiner*—Curtis E. Sherrer
(74) *Attorney, Agent, or Firm*—Davis & Bujold, P.L.L.C.

(57) ABSTRACT

There is proposed a silica gel for preventing the generation of haze in beer, a method of manufacturing the silica gel and a method of stabilization treatment of beer. The silica gel is provided with a specific surface area of 700–1000 m$^2$/g, a pore volume of 1.1–1.6 ml/g and a average pore diameter of 6–10 nm, and has a relatively high adsorbability per unit weight. In the method of manufacturing the silica gel, the washed, hydrothermally treated, acid treated, ground and dried silica hydrogel is calcined at 400–800° C. for 10 seconds to 10 hours. A haze causing component can be removed from beer by contacting the silica gel with the beer and subsequently separating the silica gel from the beer.

5 Claims, 1 Drawing Sheet

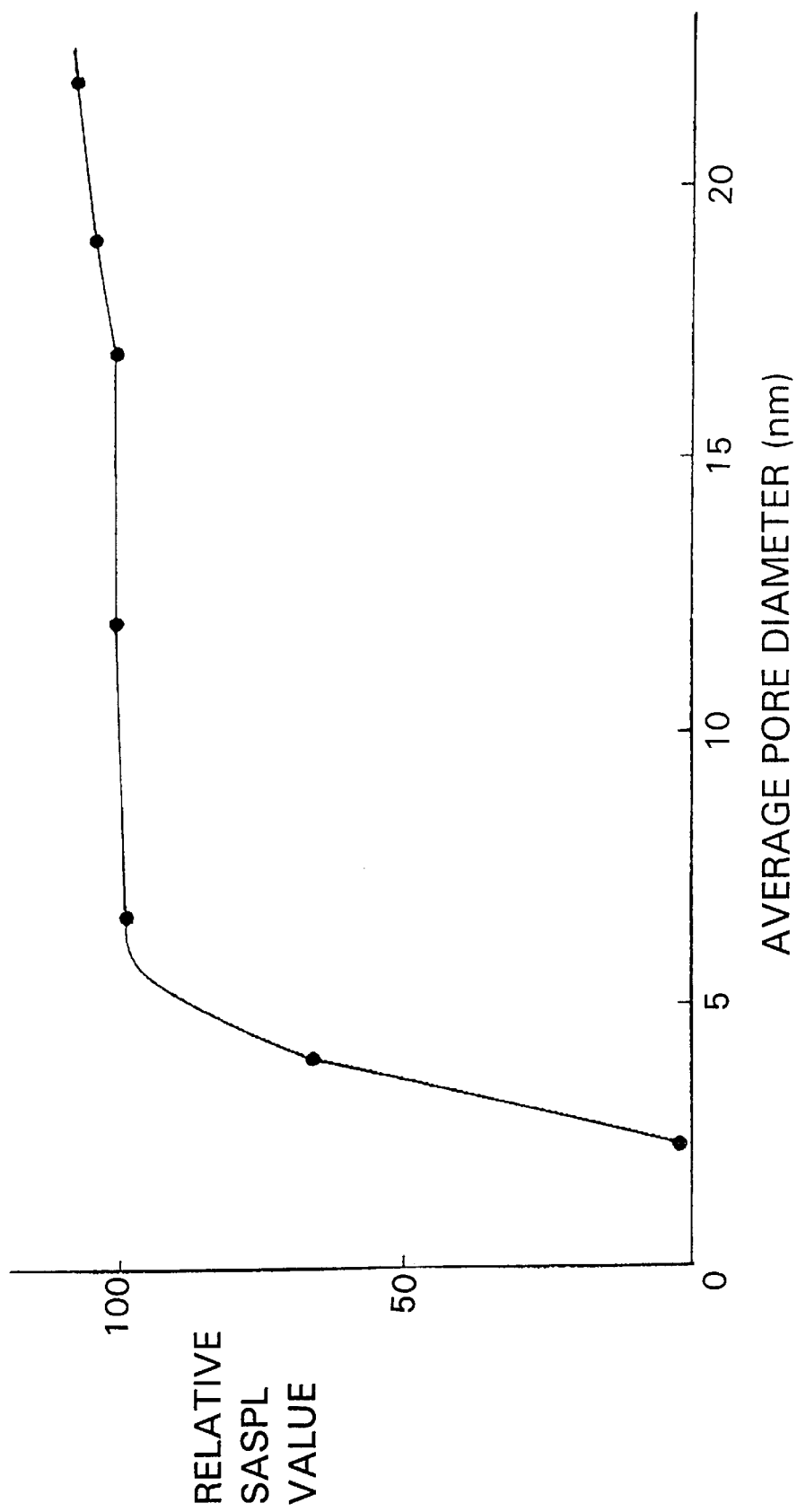

SILICA GEL FOR STABILIZATION TREATMENT OF BEER, A METHOD OF MANUFACTURING THE SILICA GEL AND A METHOD OF THE STABILIZATION TREATMENT OF BEER

BACKGROUND OF THE INVENTION

This invention relates to a silica gel used for improving the haze stability of beer, a method of manufacturing the silica gel and a method of stabilization treatment of beer using the silica gel.

Conventionally, a method of stabilization treatment of beer using a silica gel which can prevent the generation of haze in beer is known. The preparation of a silica gel having various physical properties for use in the stabilization treatment is disclosed, for example, in the examined Japanese Patent Publication No. 63-38188 and the Japanese Patent laying-open Nos. 5-70120 and 5-97421.

However, since the conventional silica gels can insufficiently prevent a haze from being generated in beer, a large quantity of the silica gels are required for providing a desired effect, which increases the cost as well as the industrial wastes resulting from the manufacture of beer. Therefore, the physical property values of the silica gel, contributing to enhancement of the haze inhibiting effect, required to be strictly selected.

The specific surface area, the pore volume, the average pore diameter and other physical properties of the silica gel are dependent on one another: when either one of the physical properties change, the other ones also change. In the conventional art, even if a certain physical property is improved to increase the haze inhibiting effect, the other physical properties possibly change dependently to act against or lower the haze inhibiting effect, and, as a result, the silica gel provides only an insufficient haze inhibiting effect. Therefore, if the physical properties of the silica gel contributing to enhancement of the haze inhibiting effect are found and arc all improved when preparing the silica gel, the haze inhibiting effect could be remarkably enhanced.

SUMMARY OF THE INVENTION

An object of this invention is to provide a silica gel having the physical properties contributing to enhancement of a haze inhibiting effect improved in a well balanced manner.

Another object of this invention is to provide a method of manufacturing a silica gel which can prevent the generation of haze of beer.

A further object of this invention is to provide a method of stabilization treatment of beer using a minimum quantity of silica gels.

To attain these or other objects, the invention provides a silica gel for stabilization treatment of beer prepared by calcination at a temperature of 400–800° C. between 10 seconds and 10 hours. The silica gel has a specific surface area of 700–1000 $m^2/g$, a pore volume of 1.1–1.6 ml/g and a average pore diameter of 6–10 nm.

If the calcination temperature is lower than 400° C., the silica gel provides an insufficient adsorbability. If the calcination temperature exceeds 800° C., although the surface of the silica gel gains an improved quality, the specific surface area and the pore volume tend to be lowered because sintering is effected. Further undesirably, the specific surface area, the pore volume and the average pore diameter or other physical properties of the silica gel cannot be easily controlled to the optimum values required in the invention.

If the calcination time is shorter than 10 seconds, the quality of the silica gel surface can be improved only insufficiently. Even if the calcination time exceeds 10 hours, a further improvement in the surface quality cannot be expected and this is ineffective in cost.

According to the invention, the silica gel desirably has a large specific surface area. If the specific surface area is less than 700 $m^2/g$, the silica gel cannot provide better adsorbability as compared with the conventional silica gel. However, the silica gel having a specific surface area greater than 1000 $m^2/g$ cannot be easily manufactured industrially, and this is not practical.

Furthermore, if the average pore diameter of the silica gel is less than 6 nm, the adsorbability of the silica gel remarkably deteriorates, while if the average pore diameter exceeds 10 nm, the specific surface area cannot be kept 700 $m^2/g$ or larger. Additionally, since the specific surface area, the average pore diameter and the pore volume are mutually dependent, the pore volume adequate for the industrial manufacture of the silica gel is between 1.1 ml/g and 1.6 ml/g while the average pore diameter and the specific surface area are controlled in the aforementioned ranges.

The present invention also provides a method of manufacturing a silica gel for stabilization treatment of beer. In the method, first a silica hydrosol is prepared by reacting silicate with inorganic acid such that the $SiO_2$ concentration is between 10% and 20% by weight, and is gelled, forming a silica hydrogel. The silica hydrogel is washed with water, hydrothermally treated with water having a pH of 2–8 at a temperature of 20–100° C. and acid treated with either inorganic or organic acid having a pH of 2–5. The washed, hydrothermally treated and acid treated silica hydrogel is ground into particles having a mean particle diameter of 5–30 $\mu$m, dried at a temperature of 100–1000° C. for 1–100 seconds, and calcined at a temperature of 400–800° C. for 10 seconds to 10 hours.

The present invention further provides a method of stabilization treatment of beer, in which the aforementioned silica gel is contacted with beer, and subsequently is separated from the beer.

As aforementioned, according to the invention, the calcination temperature is between 400° C. and 800° C., the calcination time is between 10 seconds and 10 hours, the specific surface area ranges from 700 to 1000 $m^2/g$, the pore volume ranges from 1.1 to 1.6 ml/g and the average pore diameter ranges from 6 to 10 nm. Both specific surface area and average pore diameter have relatively large physical property values. The inventors found as a result of their earnest researches that when a certain degree of average pore diameter is assured, the larger the specific surface area is, the more the adsorbability per unit weight increases, and adjusted and determined the manufacture conditions in order to increase both the specific surface area and the average pore diameter. In general, the silica gel having a large specific surface area tends to have a small average pore diameter. In this case, a haze causing component does not easily permeate the pores in the silica gel, the adsorptive surface area of the silica gel is not substantially large, and only insufficient adsorption effect can he obtained. According to the invention, however, the silica gel has a large adsorptive surface area and a relatively high adsorbability per unit weight. Therefore, even a small quantity of silica gels can provide an excellent haze inhibiting effect.

In the method of manufacturing silica gels according to the invention, the silica hydrosol is prepared by reacting silicate with inorganic acid such that the $SiO_2$ concentration is between 10 and 20% by weight and gelled. Excessively low $SiO_2$ concentration would lengthen the period of gelation time, increase water content, and deteriorate an efficiency in the subsequent washing and drying steps, which is industrially impractical. Excessively high $SiO_2$ concentration could excessively accelerate the gelation process, and the silica hydrogel having uniform physical properties could not be obtained. As the silicate, sodium silicate, potassium silicate, ammonium silicate or other is available: sodium silicate is most used industrially. For the inorganic acid, sulfuric acid, nitric acid, hydrochloric acid or other is, available: sulfuric acid is generally used.

Subsequently, by washing the silica hydrogel with water, inorganic salt is removed. When the washed silica hydrogel is hydrothermally treated with water having a pH of 2–8 at a temperature of 20–100° C., the average pore diameter and the pore volume are increased. In this process, if the silica hydrogel is washed with water under the conditions corresponding to those for the hydrothermal treatment, the washing and the hydrothermal treatment can be carried out simultaneously. For the conditions of the hydrothermal treatment, when the pH or the temperature is increased, the specific surface area tends to lower largely. When the pH or the temperature is lowered, the treatment time tends to be lengthened. Considering from these tendencies, the silica hydrogel is desirably hydrothermally treated at a pH of 6–8.5 and a temperature of 40–60° C. Furthermore, the silica hydrogel is subsequently acid treated with either an inorganic or organic acid having a pH of 2–5, and obtains an increased average pore diameter and pore volume. In the hydrothermal treatment, primary particles of silica gel are solubilized and deposited, and the specific surface area of the silica gel is decreased while the average pore diameter and the pore volume are increased. In the aforementioned acid treatment, since the pH is set lower, the quantity of the solubilized and deposited primary particles is controlled, and only at the point where polymerizing primary particles touch each other, said primary particles combine with each other. Therefore, the specific surface area is quite gradually decreased while the average pore diameter and the pore volume are increased. The primary particles obtain an increased binding strength at the point where the primary particles combine with each other. The structure of the silica gel is stabilized and strengthened. If the pH is adjusted to 2 to 5 during the hydrothermal treatment, the treatment time is lengthened. However, since the conditions of the hydrothermal treatment meet these of the acid treatment, these treatment processes can be simultaneously carried out, thereby simplifying the procedure.

In other words, the water washing process, the hydrothermal treatment process and the acid treatment process can be serially carried out, or the first two or all the three processes can be executed at the same time. When the first two or all the three processes are simultaneously carried out, the treatment conditions need to be restricted within the range effective for each of the simultaneous processes, and such restriction may lengthen the treatment time as required.

The washed, hydrothermally treated and acid treated silica hydrogel has a relatively large average pore diameter, pore volume and specific surface area. Unless such large physical properties can be kept in the subsequent processes, the final product or silica gel with a large average pore diameter, pore volume and specific surface area cannot be obtained.

In order to maintain the large physical property values, according to the invention, the silica hydrogel is finely ground to form particles having an average particle size of 5–30 μm, and dried at a temperature of 100–1000° C. for 1–100 seconds. The grinding and drying processes can be carried out serially or simultaneously. The serially executed grinding and drying processes are desirable in that the physical property values can be easily controlled However, if these processes are executed simultaneously, the procedure can be simplifed. The drying process followed by the grinding process is undesirable because the pore volume of the silica gel may not be sufficiently large. Although the drying temperature and the drying time are set in inverse proportion to each other, in the drying process according to the invention, the particles are dried relatively rapidly and completely as compared with the conventional method of manufacturing silica gels. If the drying time is prolonged, the water content in the silica gel slowly decreases, the surface tension of water causes pore volume of the silica gel to be lower disadvantageously. In the invention, the particles are completely dried or dehydrated such that the surface area is prevented from decreasing or other physical properties are prevented from changing in the subsequent calcination process. Specifically, it is known that the adsorbability of silica gel used for stabilizing beer can be improved my the calcination process. If the silica gel contains water during the calcination process, the pore volume is decreased due to the surface tension of water, or the surface area is reduced because of hydrothermal polymerization (Ostwald aging). Especially, if the silica gel containing much water is calcined, the physical properties are remarkably changed. In the method of manufacturing the silica gel according to the invention, during the acid treatment, the pore structure of the silica gel is strengthened, and the acidified surface of the silica gel provides an enhanced heat resistance. During the rapid drying process prior to the calcination process, the water content of the silica gel is decreased. Therefore, even when the silica gel is calcined, the pore structure of the silica gel hardly weakens. In the present invention, also when the silica gel is finally calcined at a temperature of 400–800° C. for 10 seconds to 10 hours, the average pore diameter and the pore volume of the silica gel are hardly lowered.

Consequently, the calcined silica gel having a large specific surface area and average pore diameter can be manufactured. Specifically, the calcined silica gel has a specific surface area of 700–1000 $m^2/g$, a pore volume of 1.1–1.6 ml/g, and a average pore diameter of 6–10 nm.

In the stabilization treatment of beer according to the present invention, since silica gel has a high adsorbability, only a minimum quantity of silica gels are required for providing an excellent haze inhibiting effect. Therefore, the quantity of silica gels used can be reduced, cost can be saved, and industrial wastes from the manufacture of beer can be minimized.

BRIEF DESCRIPTION OF THE DRAWINGS

FIG. 1 is a graph showing the relationship between the average pore diameter of a silica gel and the relative SASPL(Saturated Ammonium Sulfate Precipitation Limit) value.

DETAILED DESCRIPTION OF THE PREFERRED EMBODIMENTS (1) Preliminary Experiment 1—Experiment for Study on Average Pore Diameter, Pore Volume and Specific Surface Area In order to study the adsorbability relative to the surface area with various average pore diameters, the test samples of silica gels having various physical properties were prepared, and the quantity of each sample was determined such that the total surface area of the sample became constant.

The respective physical property values of the silica gel were measured and calculated in the following procedures.

Specific Surface Area (As) [m²/g]: the sample of silica gel was dried in an oven at 180° C. and its specific surface area was determined by a simple nitrogen adsorption method (rapid surface area measuring device, model SA-1000 produced by Shibata Kagaku-ki Kogyo K.K.).

The pore volume (Vo) [ml/g] of the sample was determined by titration using water. In general, the pore volume is obtained from a nitrogen adsorption isotherm. When the pore diameter of the silica gel is large, however, the pore volume cannot be precisely obtained from the nitrogen adsorption isotherm. Therefore, in the embodiment the titration was employed: the sample was dried and activated at 180° C.; 5 g of the sample was weighed and charged in an about 100 ml mayonnaise bottle; water was dropped into the bottle until the sample sticked softly to the bottom of the bottle; and the quantity of water at the point was regarded as the pore volume for 5 g of the sample.

The average pore diameter (APD) [nm] was calculated from the equation: APD[nm]=(4000×Vo)/As.

The number of silanol groups was calculated by measuring the weight of the silica gel sample after dried at 180° C. as a reference value and the ignition loss up to the temperature of 950° C., and supposing that the ignition loss was caused by elimination of water between silanol groups of silica gel and one molecule of water corresponded to two silanol groups.

The quantity of silica gels was calculated from the following equation:

SAMPLE QUANTITY=(SPECIFIC SURFACE AREA OF STANDARD SILICA GEL SAMPLE/SPECIFIC SURFACE AREA OF TEST SILICA GEL SAMPLE)×STANDARD QUANTITY

In the equation, the standard sample of the silica gel has a specific surface area of 600 m²/g, a pore volume of 1.30 ml and a average pore diameter of 8.7 nm, and the standard content of silica gel is 500 ppm.

The adsorbabilities of the samples were compared with one another using a relative protein adsorption ability by SASPL(Saturated Ammonium Sulfate Precipitation Limit). Specifically, a relative SASPL value was calculated by the following expression:

$$(S-B)/(C-B)\times 100$$

where

S: SASPL value of the beer treated with the test silica gel sample;

C: SASPL value of the beer treated with the standard silica gel sample; and

B: Blank SASPL value (non-treated beer).

When the calculated relative SASPL value is used, even if the beer used in the test is varied, substantially constant evaluation can be made only by using the standard sample of silica gel. The standard sample referred herein has the aforementioned physical property values.

For the SASPL value: to 50 ml of the stirred beer sample was added dropwise a saturated ammonium sulfate solution, and the turbidity at 660 nm was continuously observed; and the quantity of the saturated ammonium sulfate solution added until the turbidity suddenly increased was measured to determine the SASPL value of this beer sample (see James, S. Hough, MBAA Technical Quarterly, 13, 34[1976]).

A result of comparison is set forth in Table 1, and FIG. 1 shows a graph having a horizontal axis representing the average pore diameter and a vertical axis representing the relative SASPL value.

TABLE 1

| NO. | SPECIFIC SURFACE AREA (m²/g) | PORE VOLUME (ml/g) | PORE DIA. (nm) | QUANTITY (ppm) | RELATIVE SASPL VALUE (%) |
|---|---|---|---|---|---|
| 1 | 702 | 0.40 | 2.3 | 427 | 2.2 |
| 2 | 614 | 0.62 | 4.0 | 489 | 66 |
| 3 | 461 | 0.75 | 6.5 | 651 | 99 |
| 4 | 346 | 1.01 | 12 | 867 | 101 |
| 5 | 233 | 1.01 | 17 | 1288 | 101 |
| 6 | 201 | 0.97 | 19 | 1493 | 105 |
| 7 | 174 | 0.96 | 22 | 1724 | 109 |

As clearly seen from Table 1 and FIG. 1, when the total surface area of the used silica gel is the same, if the silica gel has a specified or larger average pore diameter, the relative SASPL value of the beer sample has a substantially constant value. If the silica gel has a average pore diameter smaller than the specified value, the relative SASPL value rapidly decreases. Especially, in the graph of FIG. 1, the average pore diameter of 6 nm and its vicinity is an inflection point. Unless the average pore diameter is kept at 6 nm or more, a colloidal component, which generates a haze in beer, cannot easily permeate the pores in the silica gel, and as a result the adsorption effect of the silica gel may be deteriorated. When the average pore diameter exceeds 6 nm, the relative SASPL value or the adsorption effect can become substantially constant. Therefore, it can be supposed that the capillary attraction or other produced by the pores exerts little influence on the adsorption mechanism, and that the affinity of the haze causing colloidal component to the silica surface physically permits the colloidal component to be adsorbed by the silica gel. In other words, when the average pore diameter is excessively small, the colloidal component cannot permeate the pores, and the adsorptive surface area of the silica gel is substantially decreased, thereby deteriorating the adsorption effect. When the silica gel has the average pore diameter sufficient for the colloidal component to permeate therein, variances in the pore diameter have little influence on the adsorption effect. When the pores have a certain degree of pore diameter, the higher the specific surface area of the silica gel is set, the higher the adsorbability per unit weight can be obtained.

(2) Preliminary Experiment 2—Experiment for Study on a Calcination Temperature

Subsequently, a method for enhancing the affinity of the haze causing colloidal component to the silica surface was studied.

Based on the assumption that the silanol groups present on the silica surface play an important role in the affinity of the haze causing colloidal component to the silica surface, the relationship between the changes in the number of silanol groups brought about by the calcination process and the relative SASPL values was studied. A result of the study is shown in Table 2. The calcination time of each sample was 4 hours.

TABLE 2

| NO. | SPECIFIC SURFACE AREA (m²/g) | PORE VOL. (ml/g) | PORE DIA. (nm) | QTY. (ppm) | CALCINATION TEMP. (° C.) | NO. OF SILANOL GROUPS (/nm²) | RELA. SASPL VALUE (%) |
|---|---|---|---|---|---|---|---|
| 8  | 346 | 1.01 | 12 | 867  | 200 | 6.1 | 101 |
| 9  | 340 | 1.00 | 12 | 882  | 300 | 5.5 | 99  |
| 10 | 342 | 1.04 | 12 | 877  | 400 | 5.0 | 110 |
| 11 | 349 | 1.01 | 12 | 860  | 500 | 4.0 | 120 |
| 12 | 281 | 1.02 | 15 | 1068 | 700 | 4.1 | 130 |
| 13 | 265 | 0.98 | 15 | 1132 | 900 | 0.5 | 133 |

As seen in Table 2, when the calcination temperature exceeds 400° C., the relative SASPL value becomes higher. Although it is unclear why the adsorbability is enhanced by the calcination process, it is shown in the table that the number of silanol groups tends to decrease while the calcination temperature is increased. Therefore, it is supposed that the silanol groups having hydrogen bond and less adsorbability are reduced in number, and the adsorptive silanol groups are substantially increased to the contrary. The table also shows that although at the calcination temperature of 900° C. the number of silanol groups is markedly decreased, the relative SASPL value is not lowered. This is probably because it does not follow that one silanol group is combined with one haze causing colloidal component since the size of the haze causing colloidal component is extremely larger than the distance between the adjoining silanol groups. It can be concluded that the adsorbability per unit surface area is improved by calcination at not lower than a certain degree of temperature.

(3) Preparation of Silica Gel for Stabilization Treatment of Beer

As can be seen from the results of the aforementioned experiments, the calcined silica gel having a certain degree of or larger average pore diameter and a specific surface area as large a possible would be effective for the stabilization treatment of beer. Such silica gel was prepared in the following procedure, so that the average pore diameter and the specific surface area of the calcined silica gel should be controlled to 6 nm or larger and 700 m²/g or larger, respectivety.

First Embodiment

The predetermined amounts of a sodium silicate aqueous solution and a sulfuric acid were charged, such that the $SiO_2$ concentration was 20% by weight, into a mixer having a strong shearing force to prepare a uniform silica hydrosol having an excess acid concentration of 1.0N, then the silica hydrosol was left to stand at room temperature for 2 hours, to obtain a uniform block silica hydrogel. This silica hydrogel was then washed for 10 hours with the industrial water having a pH of 7.5 and a temperature of 40° C. to remove sodium sulfate therefrom. Subsequently, the silica hydrogel was hydrothermally treated in the industrial water having a pH of 7.5 and a temperature of 70° C. for 7 hours, and acid treated or dipped in a sulfuric acid having a pH of 2.5 at 15° C. for 5 hours.

Subsequently, the silica hydrogel was finely ground by an ACM mill into particles having an average particle size of 13 μm, then dried with hot air in a flash drier at 700° C. for about 8 seconds, and finally calcined in a shelf-type kiln at 500° C. for 4 hours, to obtain a silica gel having the respective physical property values set forth below:

Specific surface area: 740 m²/g
Pore volume: 1.30 ml/g
Average pore diameter: 7.0 nm
Number of silanol groups: 2.45/nm²

The relative SASPL value of the beer sample treated with this silica gel was measured 148% when the content of silica gel was 500 ppm.

Second Embodiment

The predetermined amounts of a sodium silicate aqueous solution and a sulfuric acid were charged, such that the $SiO_2$ concentration was 20% by weight, into a mixer having a strong shearing force to prepare a uniform silica hydrosol having an excess acid concentration of 1.0N, then the silica hydrosol was left to stand at room temperature for 2 hours, to obtain a uniform block silica hydrogel. This silica hydrogel was then washed for 10 hours with the industrial water having a pH of 7.6 and a temperature of 40° C. to remove sodium sulfate therefrom. Subsequently, the silica hydrogel was hydrothermally treated in the industrial water having a pH of 7.5 and a temperature of 60° C. for 10 hours, and acid treated or dipped in a sulfuric acid having a pH of 2.5 at 55° C. for 5 hours.

Subsequently, the silica hydrogel was finely ground by an ACM mill into particles having an average particle size of 13 μm, then dried with hot air in a flash drier at 700° C. for about 8 seconds, and finally calcined in a shelf-type kiln at 500° C. for 4 hours, to obtain a silica gel having the respective physical property values set forth below:

Specific surface area: 802 m²/g
Pore volume: 1.37 ml/g
Average pore diameter: 6.8 nm
Number of silanol groups: 2.4/nm²

The relative SASPL value of the beer sample treated with this silica gel was measured 156% when the content of silica gel was 500 ppm.

Both average pore diameter and specific surface area of the silica gels manufactured in the aforementioned embodiments are large, and the beer treated with the silica gels presents an excellent relative SASPL value. Especially, the silica gel resulting from the second embodiment provides better relative SASPL value as compared with the silica gel of the first embodiment.

The evaluation of the properties of the beer treated with the silica gel according to the second embodiment is now explained.

Green beer manufactured in a pilot plant having a scale of 2 kl was fermented and aged in a lagering tank about one month, and was treated by the silica gel prepared in the second embodiment in amounts of 500 g per kiloliter of the beer, together with the filter aid. After the beer was brought in contact with the silica gel for 10 minutes, the beer was filtered at 2° C. for 4 hours, through diatomaceous earth in a filter machine having a filtration area of 0.2 m² at the flow rate of 500 liters/m²/hour, and was then bottled, forming Test Beer 1 referred to herein. For reference, another green beer was treated in the same way as mentioned above; however, this time with the commercial silica gel for stabilization treatment of beer (trade name Sylopute 30 produced by Fuji Silysia Cheimical Ltd.), instead of the silica gel of the second embodiment, and bottled in the same manner as Test Beer 1, thereby preparing Control Beer 1 referred to herein. The filterability in the diatomaceous earth filter machine is shown in Table 3.

TABLE 3

|  | DIFFERENTIAL PRESSURE RISING RATE [kg/cm$^2$/hr] | TURBIDITY AT THE OUTLET OF FILTER MACHINE [ppm] |
| --- | --- | --- |
| TEST BEER 1 | 0.14 | 0.4 |
| CONTROL BEER 1 | 0.15 | 0.3 |

As shown in Table 3, when the silica gel of the second embodiment is used, the differential pressure rising rate of the diatomaceous earth filter machine is substantially the same as when the commercial or standard silica gel is used. The turbidity of the beer at the outlet of the filter machine was measured by a haze meter (produced by MONITEK GmbH) as time lapsed, and indicated no problem. Therefore, the beer treated with the silica gel of the second embodiment can be filtered without problem.

The properties of the aforementioned bottled beer were analyzed in the following method.

(1) Turbidity on the Day of Production

The beer on the day when bottled after the treatment was measured for the turbidity at 20° C. using a haze meter.

(2) Turbidity After Storage of 2 Weeks at 50° C.

After the bottled beer was placed in a thermostatic chamber at 50° C. and stored for 2 weeks to promote degradation, the turbidity of the beer was measured at a temperature of 20° C. using the haze meter.

(3) Chill Haze After Storage for 2 Weeks at 50° C.

The above described beer stored at 50° C. was further placed in a thermostatic bath at 0° C., then, after allowing the chill haze to deposit for 24 hours, the turbidity was measured at a temperature of 0° C. using the haze meter.

(4) Total Nitrogen

The proteins in the beer were hydrolyzed and the nitrogen content was measured according to Kjeldahl method.

(5) Polyphenols

Measured according to the EBC method.

(6) Color

Measured according to the EBC method.

(7) Head Formation

The beer at 8° C. was poured to a glass from a height of 3 cm above the top of the glass, the amount of foam when the foam was grown to top end was read from the calibration on the glass.

(8) Head Retention

The time to when the foam in (7) disappeared and a specified light started passing through the thinned foam layer was measured.

(9) Beer Taste

The test beer and the control beer were compared by drinking by a pair test or a triangle test.

Results of the aforementioned analysis are shown in Table 4.

TABLE 4

|  | TEST BEER 1 | CONTROL BEER 1 |
| --- | --- | --- |
| TURBIDITY ON THE DAY OF PRODUCTION [EBCf.u] | 0.31 | 0.31 |
| TURBIDITY AFTER STORAGE FOR 2 WEEKS AT 50° C. [EBCf.u.] | 0.47 | 0.67 |
| CHILL HAZE AFTER STORAGE FOR 2 WEEKS AT 50° C. [EBCf.u.] | 8.7 | 13.4 |
| TOTAL NITROGEN [mg/100 g] | 51.8 | 52.1 |
| POLYPHENOLS [mg/L] | 169 | 173 |
| COLOR [EBC] | 5.7 | 5.5 |
| HEAD FORMATION (ml) | 108 | 100 |
| HEAD RETENTION (seconds) | 182 | 166 |
| BEER TASTE | THESE ARE EQUIVALENT IN TASTE | |

As shown in Table 4, when the silica gel of the second embodiment is used, the haze causing colloidal component can be effectively removed from beer, without deteriorating the taste, foam or other characteristic of beer.

Subsequently, the quantity of silica gel according to the second embodiment was reduced by 35% down to the concentration of 325 ppm. The stabilizing effect of the silica gel according to the second embodiment was compared with that of the commercial silica gel added in the concentration of 500 ppm.

Specifically, green beer manufactured in a pilot plant having a scale of 2 kl was fermented and aged in a lagering tank about one month, and was treated by the silica gel prepared in the second embodiment in the quantity of 325 g per kiloliter of the beer, together with the filter aid. After the beer was brought in contact with the silica gel for 10 minutes, the beer was filtered at 2° C. for 4 hours. through diatomaceous earth in a filter machine having a filtration area of 0.2 m$^2$ at the flow rate of 500 liters/m$^2$/hour, and was then bottled, forming Test Beer 2 referred to herein. For reference, another green beer was treated in the same way as mentioned above; however, this time by using the commercial silica gel (trade name Sylopute30 produced by Fuji Silysia Chemical Ltd.) in the quantity of 500 g per kiloliter of beer, instead of the silica gel of the second embodiment, and bottled in the same manner as Test Beer 2, thereby preparing Control Beer 2 referred to herein. The filterability of the beer in the diatomaceous earth filter machine is shown in Table 5.

TABLE 5

|  | DIFFERENTIAL PRESSURE RISING RATE [kg/cm$^2$/hr] | TURBIDITY AT THE OUTLET OF FILTER MACHINE [ppm] |
| --- | --- | --- |
| TEST BEER 2 | 0.15 | 0.4 |
| CONTROL BEER 2 | 0.18 | 0.4 |

As shown in Table 5, no problem was found in the filterability.

The characteristics of the beer was analyzed in the same manner as aforementioned, and results of the analysis are shown in Table 6.

TABLE 6

|  | TEST BEER 2 | CONTROL BEER 2 |
|---|---|---|
| TURBIDITY ON THE DAY OF PRODUCTION [EBCf.u] | 0.31 | 0.32 |
| TURBIDITY AFTER STORAGE FOR 2 WEEKS AT 50° C. [EBCf.u.] | 0.68 | 0.67 |
| CHILL HAZE AFTER STORAGE FOR 2 WEEKS AT 50° C. [EBCf.u.] | 13.2 | 13.2 |
| TOTAL NITROGEN [mg/100 g] | 56.3 | 56.1 |
| POLYPHENOLS [mg/L] | 210 | 211 |
| COLOR [EBC] | 5.5 | 5.5 |
| HEAD FORMATION (ml) | 96 | 94 |
| HEAD RETENTION (seconds) | 180 | 175 |
| BEER TASTE | THESE ARE EQUIVALENT IN TASTE | |

As seen in Table 6, even less quantity of the silica gel as compared with in the conventional method an provide substantially the same effect.

As aforementioned, the silica gel of the second embodiment even when reduced in quantity causes no problem in filterability and can stabilize beer as effectively as the conventional silica gel. Therefore, according to the invention, the quantity of the silica gel required for stabilization treatment of beer can be reduced, thereby saving cost for silica gels. Furthermore, during the filtration process, time is prolonged until the sludge space in the filter machine is filled, thereby enhancing the productivity. In addition, the quantity of the used or waste silica gels can be advantageously decreased.

While the preferred embodiments of the invention have been described, it is to be understood that the invention is not limited thereto, and may be otherwise embodied within the scope of the following claims.

What is claimed is:

1. A dehydrated silica gel for haze reduction treatment of beer having a specific surface area of 700–1000 m$^2$/g, a pore volume of 1.1–1.6 ml/g, an average pore diameter of 6.8–10 nm, and improved adsorbability characteristics, the dehydrated silica gel being prepared by a method comprising the steps of:

preparing a silica hydrosol by reacting silicate with inorganic acid such that the $SiO_2$ concentration is between 10% and 20% by weight;

gelling the silica hydrosol to form a silica hydrogel;

washing the silica hydrogel with water;

then hydrothermally treating the silica hydrogel with water at a temperature of 20–100° C. within a first pH range;

treating the silica hydrogel with either an inorganic or an organic acid within a second pH range;

finely grinding the washed, hydrothermally treated and acid treated silica hydrogel into particles having an average particle size of 5–30 μm;

rapidly drying the ground silica hydrogel at a temperature of 100–1000° C. for 1 second to 100 seconds to form a dried silica gel;

subsequently calcining the dried silica gel at a temperature of 400–800° C. for 10 seconds to 10 hours to improve adsorbability characteristics by reducing a non-adsorbing portion of the silica gel or modifying the chemical structure of at least a portion of the silica gel.

2. The dehydrated silica gel as set forth in claim 1 being prepared by the method further comprising the steps of providing the first pH range of the hydrothermal treatment water and the second pH range of the inorganic or organic acid within a matching pH range and simultaneously performing the steps of hydrothermally treating the silica hydrogel with water and treating the silica hydrogel with either the inorganic or the organic acid.

3. The dehydrated silica gel as set forth in claim 2 being prepared by the method further comprising the steps of providing the first and second pH with the range of 2–5.

4. The dehydrated silica gel as set forth in claim 1 being prepared by the method further comprising the steps of providing the first pH range of the hydrothermal treatment water and the second pH range of the inorganic or organic acid within differing pH ranges and sequentially performing the steps of first hydrothermally treating the silica hydrogel with water and then treating the silica hydrogel with either the inorganic or the organic acid.

5. The dehydrated silica gel as set forth in claim 4 being prepared by the method further comprising the steps of providing the first pH within the range of 2–8 and the second pH within the range of 2–5.

* * * * *